United States Patent [19]

Geiser

[11] Patent Number: 5,413,749
[45] Date of Patent: May 9, 1995

[54] PROCESS OF MAKING BEADS FOR A LIQUID PURIFICATION BED

[75] Inventor: Kurt M. Geiser, Maplewood, Minn.

[73] Assignee: Wheelabrator Engineered Systems Inc., New Brighton, Minn.

[21] Appl. No.: 72,533

[22] Filed: Jun. 4, 1993

[51] Int. Cl.⁶ ............................................. B29C 59/02
[52] U.S. Cl. .................................. 264/293; 264/320; 264/340
[58] Field of Search .................. 264/293, 320, 328.17, 264/340

[56] References Cited

U.S. PATENT DOCUMENTS

| | | |
|---|---|---|
| 468,984 | 2/1892 | Boeing . |
| 4,98,301 | 4/1980 | Iwatani ............................ 210/274 |
| 1,403,311 | 1/1922 | Gaillet . |
| 3,122,594 | 2/1964 | Kielback . |
| 3,293,174 | 12/1966 | Robjohns . |
| 3,343,680 | 9/1967 | Rice et al. . |
| 3,424,674 | 1/1969 | Webber ............................ 210/189 |
| 3,557,955 | 1/1971 | Hirs et al. . |
| 3,671,426 | 6/1972 | Orcutt et al. . |
| 3,814,245 | 6/1974 | Hirs . |
| 3,814,247 | 6/1974 | Hirs . |
| 3,846,305 | 11/1974 | Schreiber et al. . |
| 3,956,128 | 5/1976 | Turner . |
| 4,052,300 | 10/1977 | Mosso . |
| 4,115,266 | 9/1978 | Ohshima . |
| 4,125,467 | 11/1978 | Haddad et al. . |
| 4,208,281 | 6/1980 | Haberer et al. . |
| 4,290,894 | 9/1981 | Török et al. . |
| 4,340,642 | 7/1982 | Netting et al. . |
| 4,411,847 | 10/1983 | Netting et al. . |
| 4,420,403 | 12/1983 | Tufts ............................... 210/807 |
| 4,420,442 | 12/1983 | Sands . |
| 4,421,562 | 12/1983 | Sands . |
| 4,427,555 | 1/1984 | Brown et al. ................... 210/805 |
| 4,446,027 | 5/1984 | Simmers ......................... 210/795 |
| 4,447,475 | 5/1984 | Lubbock et al. . |
| 4,454,040 | 6/1984 | Roberts . |
| 4,547,286 | 10/1985 | Hsiung ............................ 210/738 |
| 4,608,181 | 8/1986 | Hsiung et al. .................. 210/786 |
| 4,725,367 | 2/1988 | McKim et al. . |
| 4,743,382 | 5/1988 | Williamson et al. . |
| 4,780,219 | 10/1988 | Witek ............................. 210/786 |
| 4,793,934 | 12/1988 | Thompson et al. ............ 210/715 |
| 5,009,776 | 4/1991 | Banks ............................ 210/108 |
| 5,030,353 | 7/1991 | Stuth ............................. 210/615 |
| 5,126,042 | 6/1992 | Malone .......................... 210/150 |
| 5,200,081 | 4/1993 | Stuth ............................. 210/615 |
| 5,202,027 | 4/1993 | Stuth ............................. 210/615 |

FOREIGN PATENT DOCUMENTS

| | | |
|---|---|---|
| 833327 | 4/1960 | United Kingdom . |
| 1147054 | 4/1969 | United Kingdom . |
| 1204880 | 9/1970 | United Kingdom . |
| 1264782 | 2/1972 | United Kingdom . |
| 1305399 | 1/1973 | United Kingdom . |
| 1317433 | 5/1973 | United Kingdom . |

OTHER PUBLICATIONS

Proceedings 40th International Water Conference, Engineers' Society of Western Pennsylvania, Oct. 30, 31--Nov. 1, 1979, pp. 25-27.

Stukenberg, et al., "Pilot Testing the Haberer Process in the United States", *Research and Technology*, pp. 90-96, Sep. 1991.

Haberer, et al., "The Haberer Process: Combining Contact Flocculation, Filtration, and PAC Adsorption", *Research and Technology*, pp. 82-89, Sep. 1991.

*Primary Examiner*—Leo B. Tentoni
*Attorney, Agent, or Firm*—Klarquist Sparkman Campbell Leigh & Whinston

[57] ABSTRACT

Liquid is purified by passing it through a bed containing disc-shaped buoyant media beads having grooved surfaces. Such beads are formed from a polymeric pellets. The pellets are passed through a scarifier to roughen their surfaces. Pellets are also passed through a rolling mill which grooves the pellets and compresses them into disc-like shapes.

14 Claims, 3 Drawing Sheets

PROCESS OF MAKING BEADS FOR A LIQUID PURIFICATION BED

BACKGROUND OF THE INVENTION

This invention concerns particulate media used in a bed for the purification of water or other liquids.

It has been known for some time that solids can be removed from a liquid by passing the liquid through a bed of particulate media. Examples of such methods are described in U.S. Pat. Nos. 4,608,181 (Hsiung et al.), 4,725,367 (McKim et al.), 4,780,219 (Witek), and 5,009,776 (Banks).

Heretofore, the media has been selected, for convenience, from among commercially available products intended for other uses. For example, some filters have been made using polypropylene or polyethylene pellets of the type that are sold to supply injection molding machines. While such prior media have worked, they are not optimized for operation in liquid purification.

Alternatively, water purification apparatuses have employed beds of plastic chunks which are made by comminuting larger bodies of a plastic material. For example, media has been made by melting polypropylene beads to form blocks of polypropylene which are subsequently cooled and ground up. The resulting polypropylene chunks had the properties described in U.S. Pat. No. 4,608,181 (Hsiung et al.). While plastic chunks can be manufactured to have excellent properties for liquid purification, they are expensive to make because energy must be consumed to melt the plastic material to form the large bodies. And, as a result of the heating, portions of the material may be altered undesireably in composition or properties. Also, because such chunks are made using a grinding process, plastic fines are produced. These fines must be removed before the media chunks can be used in a liquid treatment vessel. If the media is not cleaned properly, the fines will clog screens and other apparatus thereby causing premature headloss. Cleaning to remove fines is typically conducted in the field, so there is also a problem with environmentally proper disposal of the waste plastic fines.

Thus, there is a need for a particulate media that is produced affordably and yet provides excellent results when used for liquid purification.

SUMMARY OF THE INVENTION

It has now been found that a particulate media, particularly suitable for use in purifying water and other liquids, can be made from common starting materials by a simple method. The resulting media performs as well or better than the best prior media and is produced at a fraction of the cost of other high-efficiency media.

Media of the present invention are beads which can be made from a common polymeric precursor material. In particular, the beads can be made from commonly available plastic pellets which, as delivered, are of a suitable volume and are otherwise suitable for use in liquid treatment, but which pellets are not be of the best shape or texture. The composition of the polymeric material is selected so that the media will be suitable for its intended use, e.g. will have a desired specific gravity. For beads used for the preparation of potable water, the selected material should be nontoxic. The polymeric material is also selected for its ability to be cold worked.

To roughen the surfaces of such polymeric pellets, the pellets are passed through a scarifier or like apparatus. A bed of media with such scarified surfaces will retain a greater amount of particulate material than a bed of similar media with unroughened surfaces. The use of such media allows a treatment apparatus to operate for a longer period of time between bed cleanings.

Also, to increase their surface area, plastic pellets are compressed into disc-like shapes. After compression, a resulting media bead has generally convex upper and lower surfaces and a perimeter or annular edge surface on the rim of the disc. Beads of a such a disc-like shape have a greater surface area and should pack more densely than uncompressed pellets. Disc-like beads are thus better in collecting solids from a passing liquid.

To still further increase the surface area of a solids separation bed, multiple grooves are provided in the surfaces of the media beads. Such grooves can be inscribed by passing plastic pellets through a roller mill having rolls with striated surfaces. The pattern of closely spaced grooves on the roll surfaces is transferred to the surfaces of the plastic pellets. Preferably the grooves are formed in the pellets, at the same time the pellets are flattened, by a single pass through a roller mill.

It is among the advantages of the present invention that the beads have excellent properties for use in a liquid purification bed and that they are produced at low cost, with little waste, and with no environmental problems. It is further advantageous that beads of such high quality are ready for use immediately upon their manufacture, without cleaning.

DETAILED DESCRIPTION

Figure 1:
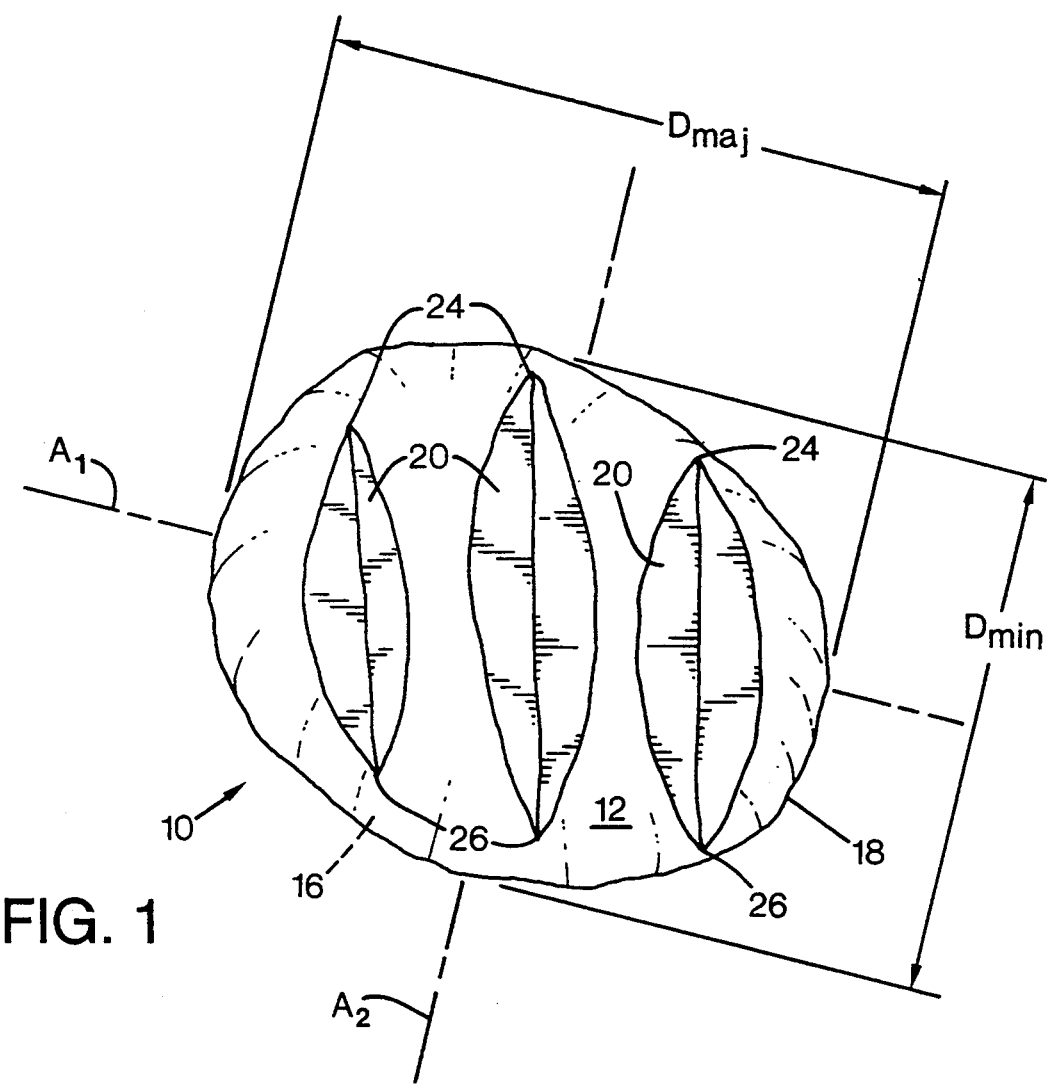
FIG. 1 is a schematic top view of a particulate media bead.

The present invention is best understood with reference to the drawing figures which illustrate an example of one preferred bead adapted for use in liquid purification.

Figure 2:
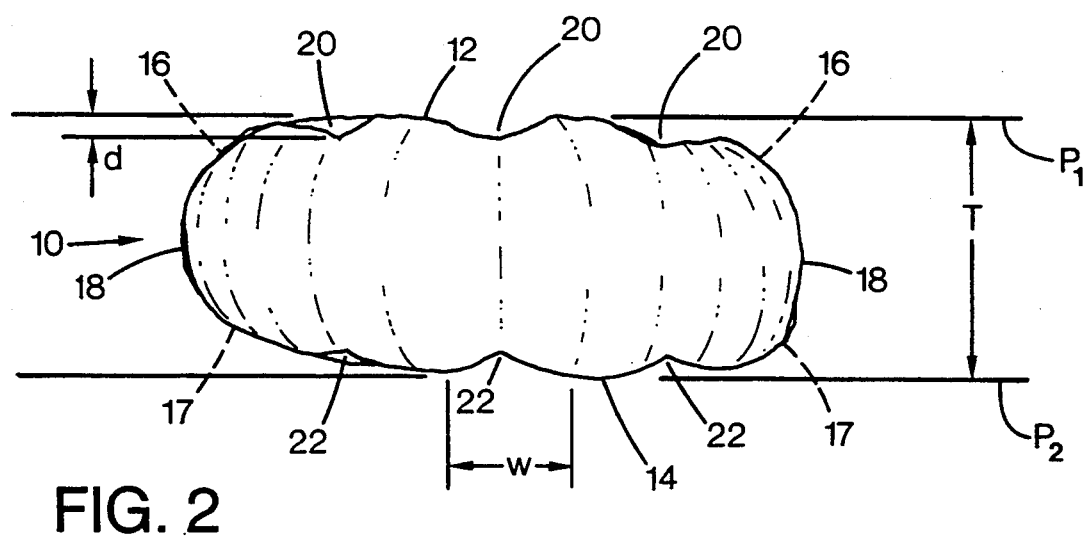
FIG. 2 is a schematic side view of the bead of FIG. 1.
Figure 3:
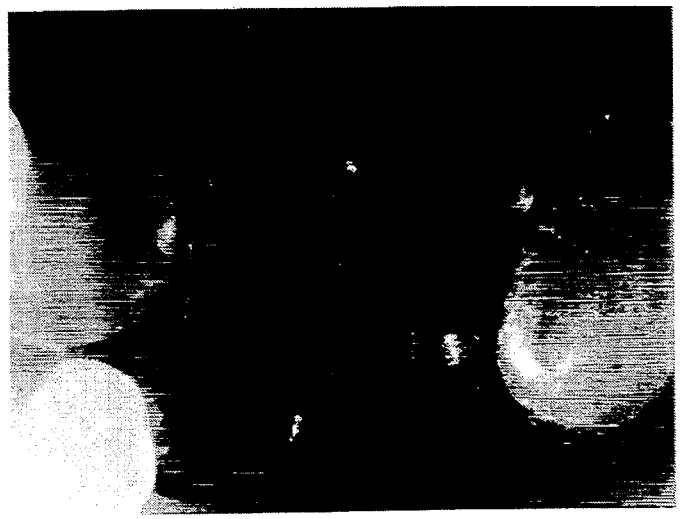
FIGS. 3-5 are photographs showing enlarged upper surfaces of particulate media beads.
Figure 4:
Figure 5:
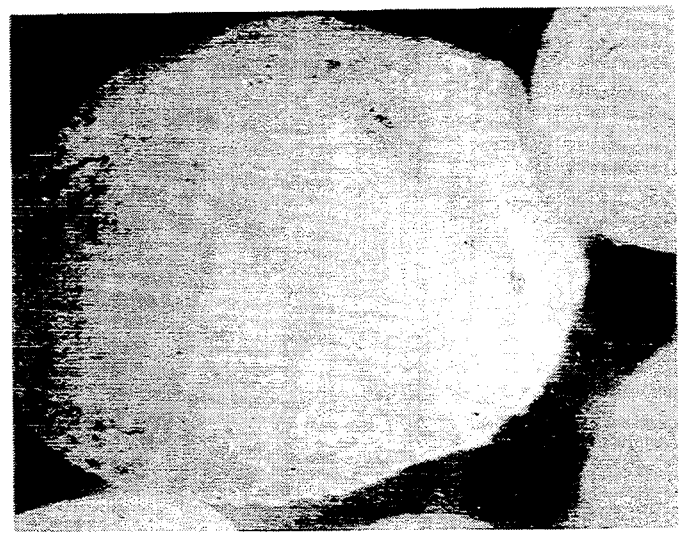

As can be seen from FIGS. 1 and 2, a bead 10 has a disc-like shape with upper and lower surfaces 12, 14 that have generally elliptical perimeters 16, 17. An annular edge surface 18 joins the upper and lower surfaces 12, 14 at their perimeters 16, 17. As can be seen in FIG. 2, the upper and lower surfaces 12, 14 are slightly convex or rounded approaching the edge surface 18.

The annular edge wall 18 of the bead has a diameter, as measured between opposed points on the annular edge surface 18, in the range of 3 to 6 mm. The edge surface 18 is elliptical when the bead is viewed from the top as in FIG. 1, being either circular (not shown) or oblong as illustrated. Beads that are not circular have multiple diameters of different lengths, depending on the direction in which the measurement is taken. Such oblong beads have a major axis $A_1$ and a minor axis $A_2$. The diameter $D_{maj}$ of such an oblong bead, as measured along the major axis $A_1$, is 4-6 mm. As measured along the minor axis $A_2$, the diameter $D_{min}$ is 3-5 mm. The bead has a thickness T of 1.2-2.5 mm. The thickness T is the distance between the most closely spaced parallel planes $P_1$, $P_2$ between which the bead can fit. Beads of the above described configuration have an average effective size in the range of 3 to 4.5 mm and an average sphericity of less than 0.9.

Grooves 20, 22 are formed in the upper and lower surfaces 12, 14. The grooves commonly extend between two locations 24, 26 at or near the annular edge surface 18. Most such grooves have a width w, as measured at a groove's widest point at the surface of the bead, that is 0.4–1 mm. They also have a depth d, as measured at a groove's deepest point, that is at least 0.1 mm. Optimum results are achieved when majority of the beads have at least three grooves on both the upper and lower surfaces, including at least one groove on each surface that has the above listed dimensions. For other of the grooves, particularly those farthest from the centers of the surfaces, the width w and depth d can be less.

Beads of a particularly preferred embodiment have one or more of the following additional characteristics. The bead diameter is in the range of 3.5 to 5.0 mm. For substantially circular beads the diameter is in the range of 4.0 to 4.5 mm. Oblong beads have a diameter $D_{maj}$ of 4.0–5.0 mm and a diameter $D_{min}$ of 3.5–4.0 mm. The thickness T is 1.7–2.0 mm. The beads have an average effective size in the range of 3.5 to 3.8. One or more grooves 20, 22 have a width w that is 0.6–0.8 mm and a depth d that is 0.2–0.3 mm.

Beads of the present invention are made of a polymeric or plastic material that is selected for its ability to be shaped by cold working. In addition, the material should be selected so as to be nonreactive with the liquid being filtered. For the treatment of water, high-density polyethylene is preferred. Other suitable materials include polypropylene, PVC, CPVC, nylon, and PTFE.

For a particularly useful embodiment, the plastic material is selected such that the beads will be buoyant in moving liquid to be treated. To produce buoyant beads for use in water purification, the material will best have a specific gravity of 0.90–0.98. Also, buoyant beads should be shaped to have an average sphericity in the range of 0.75 to 0.85. Nonbuoyant beads will typically be made from a material that has a specific gravity greater than 1.0.

Beads of the present invention can be manufactured by modifying standard plastic pellets of the type used to feed injection molding machines. Such pellets come from the manufacturer with smooth, slippery surfaces. Typically, such pellets are concavo-convex in shape, i.e. each pellet has one surface that is concave and an opposite surface that is convex. An example material is 9402 CHEVRON high density polyethylene pellets manufactured by Chevron Plastics of Houston, Tex., USA.

In a particular example, pellets are passed through a Clipper Eddy-Giant model huller/scarifier manufactured by Bluffton Agri/Industrial Corp. of Bluffton, Indiana, USA. During their passage through the huller/scarifier, the pellet surfaces are roughened by contact with the interior surface of a rotating drum covered with carborundum abrasive material. The rotation speed is set sufficiently high and the feed rate is set sufficiently low that the huller/scarifier removes the surface sheen of the raw pellets and gives them a surface which looks dull and, when viewed with magnification, appears to be fuzzy. The rotation speed is set sufficiently low and the feed rate is set sufficiently high that no significant amount of material is removed from the pellets, i.e. that the pellets are not reduced in average size or mass during treatment in the huller/scarifier.

To reduce the sphericity of such standard pellets and to inscribe grooves, the pellets can be passed through a 10×12 single roller mill manufactured by Bluffton Agri/Industrial Corp. The rollers of the mill are set to compress the pellets into the disc-like shapes of the beads described above. The resulting disc-shaped beads have a thickness that is 20 to 40 percent less than the pellets from which they are formed.

Best results are achieved when the beads are roughened, compressed, and grooved, with the roughening step being conducted prior to grooving. If beads are roughened after grooving, the surfaces of the grooves will be smooth, which is less desirable.

Figure 6:
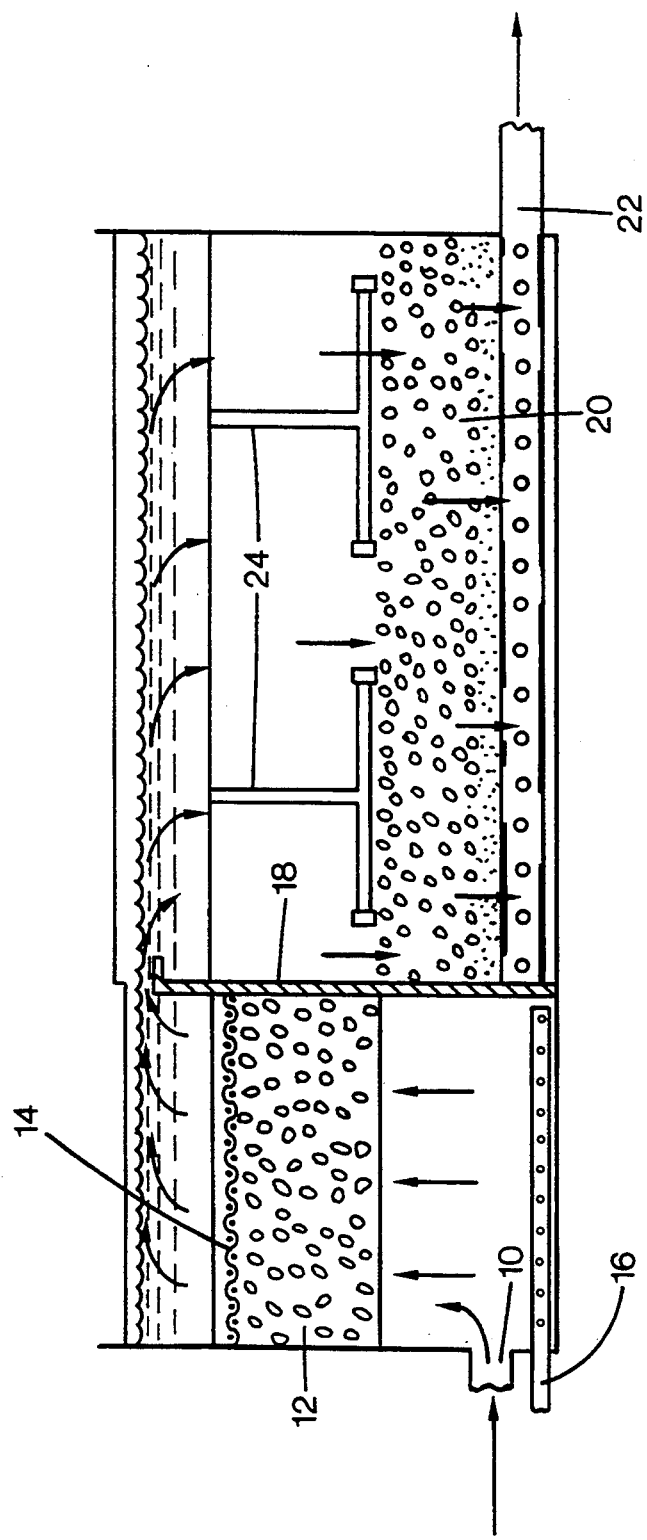
FIG. 6 is schematic diagram of a water purification apparatus containing beads of the configuration shown in FIGS. 1-5.

For liquid purification use, multiple beads are placed inside a vessel to provide a bed. Preferably the beads in the bed have a uniformity coefficient no greater than 1.4. For example, beads of a low specific gravity could be used to form the bed of buoyant media particles shown in U.S. Pat. No. 4,608,181 (Hsiung, et al), which is incorporated herein by reference. Such an apparatus is illustrated schematically in FIG. 6 which shows a two-stage water purification system. In the first stage, water enters through an inlet 30 and moves upwardly. Solids are removed from the water as it passes through a bed 32 of buoyant media that is retained under a screen 34. Due to their low specific gravity, the media beads float while the water is passing through the bed. An air distribution system 36 is provided under the bed 32 to aid in cleaning. After treatment in the first stage, the water flows over a dividing wall 38 and passes downwardly through a bed 40 of nonbuoyant media. The treated water is removed through an underdrain system 42. Spray arms 44 are provided over the bed 40 to assist is cleaning the nonbuoyant media during backwashing. Either or both of the beds 32, 40 can contain media of the type described herein.

Having illustrated the principles of my invention with reference to a preferred embodiment, it should be apparent to those skilled in the art that such an invention may be modified in arrangement and detail without departing from the principles. For example, although it is possible to use beads of the present invention in homogeneous liquid purification beds, it is also possible to use such beads in combination with other types of particulate media. In such an arrangement, the beads can be mixed with other media particles or arranged as a separate or graduated layer, e.g. in the manner described in U.S. Pat. No. 3,876,546 (Hsiung, et al.). I claim as my invention all such modifications as come within the true spirit and scope of the following claims.

I claim:

1. A method of making beads for use in a liquid purification bed, the method comprising:
   providing a supply of plastic beads having smooth surfaces; and
   forming grooves in the surfaces of the beads.

2. The method of claim 1 wherein the forming of grooves is accomplished by passing the beads through a roller mill that has at least one roll with a striated surface.

3. The method of claim 1 wherein the grooves are at least 1 mm in depth and are 0.4 to 1 mm in width.

4. The method of claim 1 wherein the beads are made of polyethylene.

5. The method of claim 1 further comprising reducing the sphericity of the beads to less than 0.9 by flattening the beads.

6. The method of claim 5 wherein the forming of the shapes comprises compressing to such an extent that the beads are reduced in thickness by 20–40 percent.

7. The method of claim 5 wherein the forming of the shapes is accomplished by passing the beads through a roller mill to compress the beads.

8. The method of claim 5 wherein the beads are formed so that a bead has:
   an upper surface with a generally elliptical perimeter;
   a lower surface with a generally elliptical perimeter;
   an annular edge surface that extends between the perimeters of the upper and lower surfaces;
   a diameter of 3 to 6 mm; and
   a thickness, as measured between the most closely spaced parallel planes between which the bead will fit, of 1.2 to 2.5 min.

9. The method of claim 8 wherein the annular edge is formed to be substantially circular.

10. The method of claim 8 wherein the annular edge is formed to be not substantially circular so that the bead has a major axis and a minor axis.

11. The method of claim 10 wherein the bead is formed such that:
   the major axis is 4 to 6 mm in length; and
   the minor axis is 3 to 5 mm in length.

12. The method of claim 5 further comprising scarifying the surface of the beads before the forming of grooves.

13. A method of making beads for use in a liquid purification bed, the method comprising:
   providing a supply of plastic beads having smooth surfaces;
   scarifying the surfaces of the beads; and
   passing the beads through a roller mill, that has at least one roll with a striated surface, to (1) form grooves in the surfaces of the beads, at least some of the grooves being at least 1 mm in depth and 0.4 to 1 mm in width, and (2) reduce the sphericity of the beads to less than 0.9 by compressing the beads to such an extent that the beads are reduced in thickness by 20–40 percent with each bead having an upper surface with a generally elliptical perimeter, a lower surface with a generally elliptical perimeter, an annular edge surface that extends between the perimeters of the upper and lower surfaces, a diameter of 3 to 6 mm, and a thickness, as measured between the most closely spaced parallel planes between which the bead can fit, of 1.2 to 2.5 mm.

14. The method of claim 13 wherein the providing comprises providing a supply of plastic beads having a specific gravity of 0.90 to 0.98 at 20° C.

* * * * *

UNITED STATES PATENT AND TRADEMARK OFFICE
CERTIFICATE OF CORRECTION

PATENT NO. : 5,413,749
DATED : May 9, 1995
INVENTOR(S) : Kurt M. Geiser

It is certified that error appears in the above-indentified patent and that said Letters Patent is hereby corrected as shown below:

On title page, item [56] References Cited - U.S. Patent Documents, "4,98,301" should be —4,198,301—.

Signed and Sealed this

Twenty-ninth Day of August, 1995

Attest:

BRUCE LEHMAN

*Attesting Officer*   *Commissioner of Patents and Trademarks*